(12) United States Patent
Shimizu et al.

(10) Patent No.: US 10,796,175 B2
(45) Date of Patent: Oct. 6, 2020

(54) DETECTION OF A DROWSY DRIVER BASED ON VEHICLE-TO-EVERYTHING COMMUNICATIONS

(71) Applicant: TOYOTA JIDOSHA KABUSHIKI KAISHA, Toyota-shi, Aichi-ken (JP)

(72) Inventors: Takayuki Shimizu, Mountain View, CA (US); John Kenney, Mountain View, CA (US); Hongsheng Lu, Mountain View, CA (US)

(*) Notice: Subject to any disclaimer, the term of this patent is extended or adjusted under 35 U.S.C. 154(b) by 0 days.

(21) Appl. No.: 16/018,972

(22) Filed: Jun. 26, 2018

(65) Prior Publication Data
US 2019/0392235 A1  Dec. 26, 2019

(51) Int. Cl.
| G06K 9/00 | (2006.01) |
| H04W 4/40 | (2018.01) |
| B60W 30/09 | (2012.01) |
| B60W 30/095 | (2012.01) |
| B60W 40/08 | (2012.01) |
| G07C 5/00 | (2006.01) |

(52) U.S. Cl.
CPC ......... G06K 9/00845 (2013.01); B60W 30/09 (2013.01); B60W 30/0956 (2013.01); B60W 40/08 (2013.01); G07C 5/008 (2013.01); H04W 4/40 (2018.02); B60W 2040/0827 (2013.01); B60W 2540/30 (2013.01); B60W 2556/65 (2020.02)

(58) Field of Classification Search
CPC .... G06K 9/00845; H04W 4/40; B60W 30/09; B60W 30/0956; B60W 40/08; B60W 2040/0827; B60W 2540/30; B60W 2550/408; G07C 5/008
See application file for complete search history.

(56) References Cited

U.S. PATENT DOCUMENTS 10,309,789 B2 * 6/2019 Ramasamy ...... G08G 1/096758
2011/0106442 A1   5/2011 Desai et al.
(Continued)

FOREIGN PATENT DOCUMENTS

JP    PO2008-023086    2/2008

OTHER PUBLICATIONS

EPO, Extended European Search Report for European Patent Application No. 19179875.0, dated Nov. 12, 2019, 9 pages.

*Primary Examiner* — Quan-Zhen Wang
*Assistant Examiner* — Mancil Littlejohn, Jr.
(74) *Attorney, Agent, or Firm* — Burbage Law, P.C.; Jon-Michael Burbage; Elizabeth Ruzich

(57) ABSTRACT

The disclosure describes embodiments for to detecting a presence of a drowsy driver of a vehicle based on Vehicle-to-Everything (V2X) communications. In some embodiments, a method includes receiving, by a first connected vehicle, a V2X message including digital data describing a path history of a second connected vehicle. The method includes determining, by the first connected vehicle, that a driver of the second connected vehicle is drowsy based on the path history described by the digital data included in the V2X message. The method includes executing, by the first connected vehicle, a remedial action that is operable to modify an operation of the first connected vehicle based on the driver of the second connected vehicle being drowsy so that a risk created by the driver is reduced.

20 Claims, 7 Drawing Sheets

(56) References Cited

U.S. PATENT DOCUMENTS

| | | | |
|---|---|---|---|
| 2015/0206434 A1* | 7/2015 | Shimotani | G08G 1/163 |
| | | | 701/36 |
| 2017/0110012 A1* | 4/2017 | Lewis | G08G 1/096791 |
| 2017/0200369 A1 | 7/2017 | Miller et al. | |
| 2017/0234689 A1* | 8/2017 | Gibson | G05D 1/0061 |
| | | | 701/25 |
| 2017/0259832 A1* | 9/2017 | Lathrop | B60W 50/14 |
| 2017/0276504 A1* | 9/2017 | Lu | G01C 21/3415 |
| 2018/0018869 A1* | 1/2018 | Ahmad | G05D 1/0223 |
| 2018/0022358 A1 | 1/2018 | Fung et al. | |
| 2019/0041223 A1* | 2/2019 | Yang | G01C 21/30 |
| 2019/0049965 A1* | 2/2019 | Tanriover | G08G 1/01 |

* cited by examiner

BSM DATA 195

- Vehicles and other client devices equipped with Dedicated Short Range Communication ("DSRC") transmit a Basic Safety Message ("BSM") at a regular interval.

- Each BSM includes the following BSM data describing one or more of the following for the vehicle that originally sent the BSM:
    (1) GPS Data Describing the Location of the Vehicle, where the GPS Data may be so accurate that it describes the specific parking space the Vehicle is parked in;
    (2) Heading Data Describing a past Direction of travel for the Vehicle, if any;
    (3) Velocity Data Describing a past Velocity of the Vehicle; and
    (4) Path History of Vehicle (e.g., path history data).

Figure 4

BSM DATA 195

Part 1

GPS Data (local 3D)
- Latitude
- Longitude
- Elevation
- Positional accuracy
- Time Vehicle Motion Data
- Transmission state
- Speed
- Heading
- Steering wheel angle
- Acceleration set (4-way, i.e., 3 axes of acceleration plus yaw rate
- Brake system status Vehicle Size Data

Part 2

Vehicle Path History
Future Vehicle Path Estimation
Hard Active Braking
Traction Control System active over 100 milliseconds?
Antilock Brake System active over 100 milliseconds?
Light Status
Wiper Status
Vehicle type
A unique identifier of the vehicle (e.g., a VIN number)
Digital data that describes: (1) whether driver of the ego vehicle is drowsy; and (2) whether the ego vehicle is in automated driving mode .

Figure 5

DETECTION OF A DROWSY DRIVER BASED ON VEHICLE-TO-EVERYTHING COMMUNICATIONS

BACKGROUND

The specification relates to detecting a presence of a drowsy driver of a vehicle based on Vehicle-to-Everything (V2X) communications.

Driving a vehicle while drowsy is dangerous. The National Highway Traffic Safety Administration of the U.S. government estimated that, between 2009 and 2013, drowsy driving has the following affects: 72,000 police-reported crashes per year; 41,000 injuries per year; and more than 800 deaths per year.

SUMMARY

Described herein are embodiments of a drowsy detection system that is installed in an onboard vehicle computer of a connected vehicle (an "ego vehicle"). In some embodiments, the drowsy detection system is operable to provide two solutions to the problem of drowsy driving.

The first solution provided by the drowsy detection system according to some embodiments is now described. Vehicles are increasingly equipped with Dedicated Short-Range Communication (DSRC) capabilities. DSRC-equipped vehicles transmit Basic Safety Messages ("BSM" if singular or "BSMs" if plural) at a regular interval (e.g., once every 0.10 seconds). BSMs have a mandatory payload that includes, among other things, information about the path history of the vehicle that transmits the BSM. A remote vehicle is driven by a drowsy driver. The remote vehicle is DSRC-equipped, and it regularly transmits BSMs that include path history data of the remote vehicle. The drowsy detection system includes software installed on an ego vehicle that receives the BSMs from the remote vehicle and analyzes the path history data to identify the presence of the drowsy driver. The ego vehicle is driven by an ego driver. The drowsy detection system is operable to notify the ego driver of the presence of the drowsy driver so that they can take steps to mitigate the danger posed to them by the drowsy driver.

The second solution provided by the drowsy detection system according to some embodiments is now described. An ego vehicle is driven by a drowsy driver and a remote vehicle is driven by a remote driver. Both the ego vehicle and the remote vehicle are DSRC-equipped, and both include an instance of the drowsy detection system installed in their onboard vehicle computer. The ego vehicle includes a driver monitoring system that detects that the driver is drowsy. In some embodiments, the drowsy detection system of the ego vehicle is installed in an Engine Control Unit (ECU) that operates the driver monitoring system. The drowsy detection system of the ego vehicle (1) identifies that the ECU is processing signals that indicate that the driver is drowsy and (2) determines whether the ego vehicle is in automated driving mode. The drowsy detection system of the ego vehicle inserts digital data into a BSM transmitted by the ego vehicle that describes (1) whether driver of the ego vehicle is drowsy; and (2) whether the ego vehicle is in automated driving mode [i.e., because the driver's drowsiness does not matter if automated driving is engaged]. The ego vehicle transmits the BSM. The remote vehicle receives the BSM. The drowsy detection system of the remote vehicle notifies the driver of the remote vehicle about the presence of the drowsy driver so that they can take steps to mitigate the danger posed to them by the drowsy driver. If the remote vehicle is an autonomous vehicle, then the remote vehicle automatically responds to the danger posed by the drowsy driver (e.g., by not assuming that the ego vehicle will be driven based on existing models of driver behavior).

There are no existing solutions to the problem of detecting drowsy drivers that use V2X communications to detect a drowsy driver and then take steps to mitigate the harm to the other drivers that are nearby the drowsy driver. The drowsy detection system beneficially provides a safer driving environment and improves the operation of a connected vehicle by assisting the connected vehicle to avoid drowsy drivers and reduce the risk caused by drowsy drivers. The drowsy detection system works even if local onboard sensors do not detect that another vehicle is driven by a drowsy driver due to non-line of sight scenarios, bad weather conditions, bad road conditions, and other variables that impede the operation of the local onboard sensors.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method including: receiving, by a first connected vehicle, a V2X message including digital data describing a path history of a second connected vehicle; determining, by the first connected vehicle, that a driver of the second connected vehicle is drowsy based on the path history described by the digital data included in the V2X message; and executing, by the first connected vehicle, a remedial action that is operable to modify an operation of the first connected vehicle based on the driver of the second connected vehicle being drowsy so that a risk created by the driver is reduced. Other embodiments of this aspect include corresponding computer systems, apparatus, and computer programs recorded on one or more computer storage devices, each configured to perform the actions of the methods.

Implementations may include one or more of the following features. The method where the V2X message is a dedicated short-range communication (DSRC) message. The method where the V2X message is not one of the following: a WiFi message; a 3G message; a 4G message; a 5G message; a long-term evolution (LTE) message; a millimeter wave communication message; a Bluetooth message; and a satellite communication. The method where the V2X message is a basic safety message. The method where the digital data describes a location of the second connected vehicle with an accuracy of substantially plus or minus half a width of a roadway which is being traveled by the second connected vehicle. The method where the remedial action includes providing a notification that describes the second connected vehicle as being operated by a drowsy driver. The method where the first connected vehicle is an autonomous vehicle and the remedial action includes the first connected vehicle automatically taking an evasive maneuver to avoid the second connected vehicle. Implementations of the described techniques may include hardware, a method or process, or computer software on a computer-accessible medium.

One general aspect includes a system including: a processor of a first connected vehicle that is operable to receive a V2X message including digital data describing a path history of a second connected vehicle; and a non-transitory memory communicatively coupled to the processor, where the non-transitory memory stores computer code that is operable, when executed by the processor, to cause the processor to determine that a driver of the second connected vehicle is drowsy based on the path history described by the digital data included in the V2X message and execute a remedial action that is operable to modify an operation of the first connected vehicle based on the driver of the second connected vehicle being drowsy so that a risk created by the driver is reduced. Other embodiments of this aspect include corresponding computer systems, apparatus, and computer programs recorded on one or more computer storage devices, each configured to perform the actions of the methods.

Implementations may include one or more of the following features. The system where the V2X message is a dedicated short-range communication (DSRC) message. The system where the V2X message is not one of the following: a WiFi message; a 3G message; a 4G message; a 5G message; a long-term evolution (LTE) message; a millimeter wave communication message; a Bluetooth message; and a satellite communication. The system where the V2X message is a basic safety message. The system where the digital data describes a location of the connected vehicle with an accuracy of substantially plus or minus half a width of a roadway which is being traveled by the connected vehicle. The system where the remedial action includes providing a notification that describes the second connected vehicle as being operated by a drowsy driver. The system where the first connected vehicle is an autonomous vehicle and the remedial action includes the first connected vehicle automatically taking an evasive maneuver to avoid the second connected vehicle. Implementations of the described techniques may include hardware, a method or process, or computer software on a computer-accessible medium.

One general aspect includes a computer program product including instructions that, when executed by a processor of a first connected vehicle, causes the processor to perform operations including: receiving a V2X message including digital data describing a path history of a second connected vehicle; determining that a driver of the second connected vehicle is drowsy based on the path history described by the digital data included in the V2X message; and executing a remedial action that is operable to modify an operation of the first connected vehicle based on the driver of the second connected vehicle being drowsy so that a risk created by the driver is reduced. Other embodiments of this aspect include corresponding computer systems, apparatus, and computer programs recorded on one or more computer storage devices, each configured to perform the actions of the methods.

Implementations may include one or more of the following features. The computer program product where the V2X message is a dedicated short-range communication (DSRC) message. The computer program product where the V2X message is not one of the following: a WiFi message; a 3G message; a 4G message; a 5G message; a long-term evolution (LTE) message; a millimeter wave communication message; a Bluetooth message; and a satellite communication. The computer program product where the remedial action is different depending on whether the first connected vehicle is an autonomous vehicle or a non-autonomous vehicle. The computer program product where the remedial action includes providing a notification that describes the second connected vehicle as being operated by a drowsy driver. The computer program product where the first connected vehicle is an autonomous vehicle and the remedial action includes the first connected vehicle automatically taking an evasive maneuver to avoid the second connected vehicle. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIGS. 4 and 5 are block diagrams illustrating an example of BSM data according to some embodiments.

DETAILED DESCRIPTION

Figure 1:
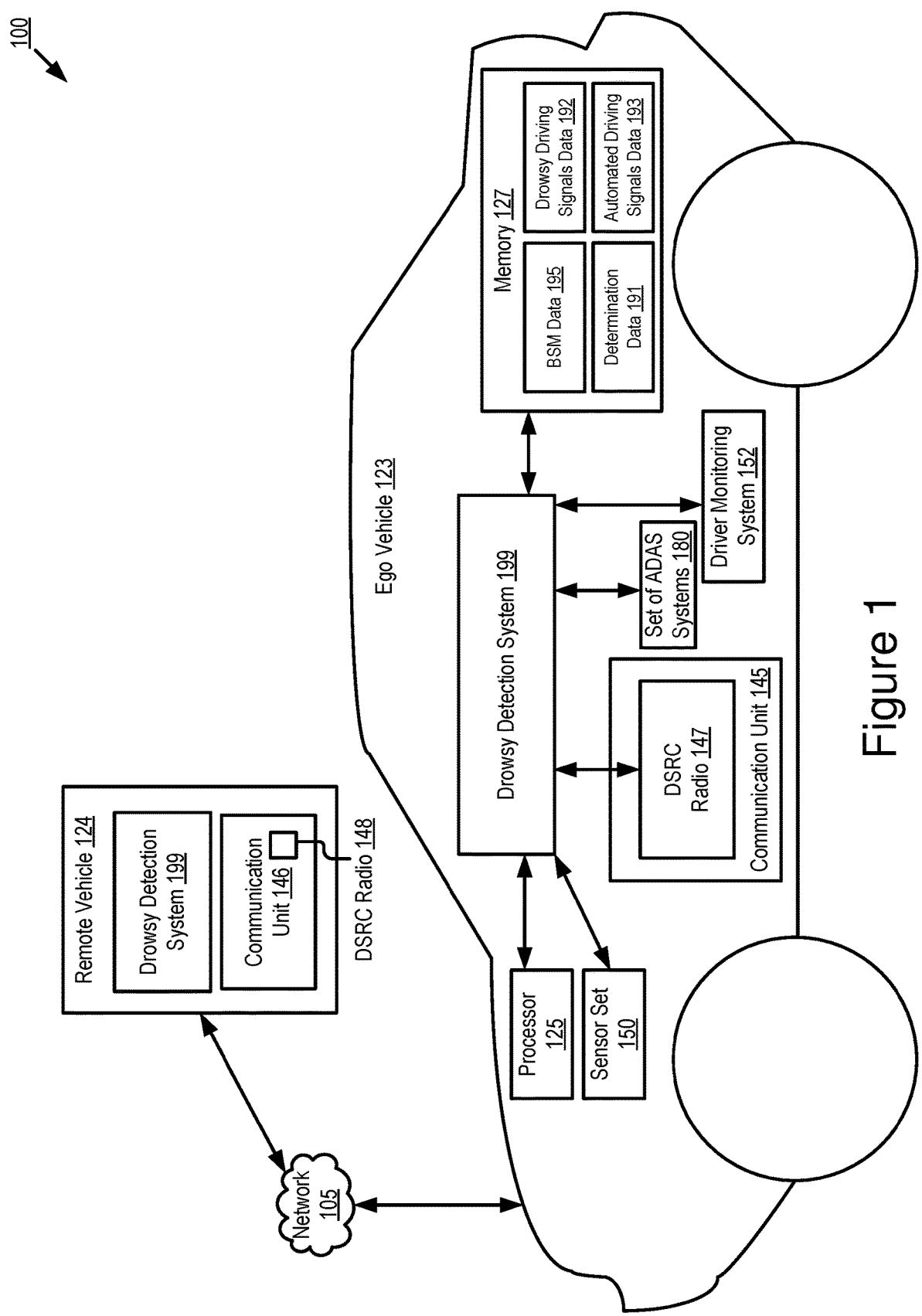
FIG. 1 is a block diagram illustrating an operating environment for a drone assistance system according to some embodiments.

Embodiments of a drone assistance system that are operable to reduce or eliminate adjacent channel interference for V2X communications are now described. Examples of V2X communication include one or more of the following: DSRC (including BSMs, among other types of DSRC communication); LTE; millimeter wave communication; full-duplex wireless communication; 3G; 4G; 5G; LTE-Vehicle-to-Everything (LTE-V2X); LTE-Vehicle-to-Vehicle (LTE-V2V); LTE-Device-to-Device (LTE-D2D); Voice over LTE (VoLTE); 5G-Vehicle-to-Everything (5G-V2X); etc.

In some embodiments, the connected vehicle that includes the drone assistance system is a DSRC-equipped vehicle. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages. A DSRC-compliant GPS unit is operable to provide positional information for a vehicle (or some other DSRC-equipped device that includes the DSRC-compliant GPS unit) that has lane-level accuracy. The DSRC-compliant GPS unit is described in more detail below A "DSRC-equipped" device is a processor-based device that includes a DSRC radio, a DSRC-compliant GPS unit and is operable to lawfully send and receive DSRC messages in a jurisdiction where the DSRC-equipped device is located. Various endpoints may be DSRC-equipped devices, including, for example, a roadside unit (RSU), a smartphone, a tablet computer and any other processor-based computing device that includes a DSRC radio and is operable to lawfully send and receive DSRC messages as described above.

In some embodiments, an RSU that is a DSRC-equipped device does not include a DSRC-compliant GPS unit, but does include a non-transitory memory that stores digital data describing positional information for the RSU having lane-level accuracy, and the DSRC radio or some other system of the RSU inserts a copy of this digital data in the BSM data that is transmitted by the DSRC radio of the RSU. In this way, the RSU does not include a DSRC-compliant GPS unit but is still operable to distribute BSM data that satisfies the requirements for the DSRC standard. The BSM data is described in more detail below with reference to FIGS. 4 and 5 according to some embodiments.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In the United States and Europe, DSRC messages are transmitted at 5.9 GHz. In the United States, DSRC messages are allocated 75 MHz of spectrum in the 5.9 GHz band. In Europe, DSRC messages are allocated 30 MHz of spectrum in the 5.9 GHz band. In Japan, DSRC messages are transmitted in the 760 MHz band with 10 MHz of spectrum. A wireless message, therefore, is not a DSRC message unless it operates in the 5.9 GHz band in the United States and Europe or the 760 MHz band in Japan. A wireless message is also not a DSRC message unless it is transmitted by a DSRC transmitter of a DSRC radio.

Accordingly, a DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

The wireless messages of key fobs made as a component of a remote keyless entry system are not DSRC messages for additional reasons. For example, the payload for a DSRC message is also required to include digital data describing a rich amount of vehicular data of various types of data. In general, a DSRC message always includes, at a minimum, a unique identifier of the vehicle which transmits the DSRC message as well as the GPS data for that vehicle. This amount of data requires a larger bandwidth than what is possible for other types of non-DSRC wireless messages. For example, FIGS. 4 and 5 depict examples of a permissible payload for a particular type of DSRC message referred to as a BSM message. The wireless messages of key fobs as a component of a remote keyless entry system are not DSRC messages because they do not include a payload which is permissible under the DSRC standard. For example, a key fob merely transmits a wireless message including a digital key which is known to a vehicle which is paired with the key fob; there is not sufficient bandwidth for other data to be included in the payload because the bandwidth allocated for these transmissions is very small. By comparison, DSRC messages are allocated large amounts of bandwidth and are required to include a far richer amount of data, including, for example, a unique identifier and the GPS data for the vehicle which transmitted the DSRC message.

In some embodiments, a DSRC-equipped vehicle does not include a conventional global positioning system unit ("GPS unit"), and instead includes a DSRC-compliant GPS unit. A conventional GPS unit provides positional information that describes a position of the conventional GPS unit with an accuracy of plus or minus 10 meters of the actual position of the conventional GPS unit. By comparison, a DSRC-compliant GPS unit provides GPS data that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway.

In some embodiments, a DSRC-compliant GPS unit is operable to identify, monitor and track its two-dimensional position within 1.5 meters of its actual position 68% of the time under an open sky.

Referring to FIG. 1, depicted is an operating environment 100 for a drowsy detection system 199 according to some embodiments. As depicted, the operating environment 100 includes the following elements: an ego vehicle 123; and a remote vehicle 124. These elements are communicatively coupled to one another by a network 105.

Although one ego vehicle 123, one remote vehicle 124, and one network 105 are depicted in FIG. 1, in practice the operating environment 100 may include one or more ego vehicles 123, one or more remote vehicles 124, and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, 5G, LTE-V2V, LTE-V2X, LTE-D2D, VoLTE, 5G-V2X or any other mobile data network or combination of mobile data networks. Further, the network 105 may include one or more IEEE 802.11 wireless networks. The network 105 may include any type of V2X network described herein.

The following are endpoints of the network 105: the ego vehicle 123; and the remote vehicle 124.

The ego vehicle 123 is any type of connected vehicle. For example, the ego vehicle 123 is one of the following types of vehicles: a car; a truck; a sports utility vehicle; a bus; a semi-truck; a robotic car; a drone or any other roadway-based conveyance. In some embodiments, the ego vehicle 123 is a DSRC-equipped vehicle.

In some embodiments, the ego vehicle 123 is an autonomous vehicle or a semi-autonomous vehicle. For example, the ego vehicle 123 includes a set of Advanced Driver Assistance Systems 180 (a set of "ADAS systems 180") which provide autonomous features to the ego vehicle 123 which are sufficient to render the ego vehicle 123 an autonomous vehicle.

The National Highway Traffic Safety Administration ("NHTSA") has defined different "levels" of autonomous vehicles, e.g., Level 0, Level 1, Level 2, Level 3, Level 4 and Level 5. If an autonomous vehicle has a higher-level number than another autonomous vehicle (e.g., Level 3 is a higher-level number than Levels 2 or 1), then the autonomous vehicle with a higher-level number offers a greater combination and quantity of autonomous features relative to the vehicle with the lower level number. The different levels of autonomous vehicles are described briefly below.

Level 0: The set of ADAS systems 180 installed in a vehicle (e.g., the ego vehicle 123) have no vehicle control. The set of ADAS systems 180 may issue warnings to the driver of the vehicle. A vehicle which is Level 0 is not an autonomous or semi-autonomous vehicle.

Level 1: The driver must be ready to take driving control of the autonomous vehicle at any time. The set of ADAS systems 180 installed in the autonomous vehicle may provide autonomous features such as one or more of the following: Adaptive Cruise Control ("ACC"); and Parking Assistance with automated steering and Lane Keeping Assistance ("LKA") Type II, in any combination.

Level 2: The driver is obliged to detect objects and events in the roadway environment and respond if the set of ADAS systems 180 installed in the autonomous vehicle fail to respond properly (based on the driver's subjective judgement). The set of ADAS systems 180 installed in the autonomous vehicle executes accelerating, braking, and steering. The set of ADAS systems 180 installed in the autonomous vehicle can deactivate immediately upon takeover by the driver.

Level 3: Within known, limited environments (such as freeways), the driver can safely turn their attention away from driving tasks, but must still be prepared to take control of the autonomous vehicle when needed.

Level 4: The set of ADAS systems 180 installed in the autonomous vehicle can control the autonomous vehicle in all but a few environments such as severe weather. The driver must enable the automated system (which is comprised of the set of ADAS systems 180 installed in the ego vehicle 123) only when it is safe to do so. When the automated system is enabled, driver attention is not required for the autonomous vehicle to operate safely and consistent with accepted norms.

Level 5: Other than setting the destination and starting the system, no human intervention is required. The automated system can drive to any location where it is legal to drive and make its own decision (which may vary based on the jurisdiction where the vehicle is located).

A highly autonomous vehicle (HAV) is an autonomous vehicle that is Level 3 or higher.

Accordingly, in some embodiments the ego vehicle 123 is one of the following: a Level 1 autonomous vehicle; a Level 2 autonomous vehicle; a Level 3 autonomous vehicle; a Level 4 autonomous vehicle; a Level 5 autonomous vehicle; and an HAV.

The set of ADAS systems 180 may include one or more of the following types of ADAS systems: an ACC system; an adaptive high beam system; an adaptive light control system; an automatic parking system; an automotive night vision system; a blind spot monitor; a collision avoidance system; a crosswind stabilization system; a driver drowsiness detection system; a driver monitoring system 152; an emergency driver assistance system; a forward collision warning system; an intersection assistance system; an intelligent speed adaption system;

a lane departure warning system (also referred to as a lane keep assistant); a pedestrian protection system; a traffic sign recognition system; a turning assistant; a wrong-way driving warning system; autopilot; sign recognition; and sign assist. Each of these example ADAS systems provide their own features and functionality that may be referred to herein as an "ADAS feature" or "ADAS functionality," respectively. The features and functionality provided by these example ADAS systems are also referred to herein as an "autonomous feature" or an "autonomous functionality," respectively.

The driver monitoring system 152 is an ADAS system that identifies when a vehicle, such as the ego vehicle 123, is being driven by a drowsy driver. The driver monitoring system 152 is a conventional driver monitoring system.

In some embodiments, the ego vehicle 123 includes the following elements: a processor 125; a memory 127; a sensor set 150; a communication unit 145; the set of ADAS systems 180 including the driver monitoring system 152; and a drowsy detection system 199.

In some embodiments, the processor 125 and the memory 127 may be elements of an onboard vehicle computer system (such as computer system 200 described below with reference to FIG. 2). The onboard vehicle computer system may be operable to cause or control the operation of the drowsy detection system 199 of the ego vehicle 123. The onboard vehicle computer system may be operable to access and execute the data stored on the memory 127 to provide the functionality described herein for the drowsy detection system 199 of the ego vehicle 123 or its elements (see, e.g., FIG. 2). The onboard vehicle computer system may be operable to execute the drowsy detection system 199 which causes the onboard vehicle computer system to execute one or more steps of one or more of the method 300 described below with reference to FIG. 3. The onboard vehicle computer system may be operable to execute the drowsy detection system 199 which causes the onboard vehicle computer system to execute one or more steps of one or more of the method 600 described below with reference to FIGS. 6A and 6B.

In some embodiments, the processor 125 and the memory 127 may be elements of an onboard unit. The onboard unit includes an ECU or an onboard vehicle computer system that may be operable to cause or control the operation of the drowsy detection system 199. The onboard unit may be operable to access and execute the data stored on the memory 127 to provide the functionality described herein for the drowsy detection system 199 or its elements. The onboard unit may be operable to execute the drowsy detection system 199 which causes the onboard unit to execute one or more steps of one or more of the method 300 described below with reference to FIG. 3. The onboard unit may be operable to execute the drowsy detection system 199 which causes the onboard unit to execute one or more steps of one or more of the method 600 described below with reference to FIGS. 6A and 6B. In some embodiments, the computer system 200 depicted in FIG. 2 is an example of an onboard unit.

In some embodiments, the ego vehicle 123 may include a sensor set 150. The sensor set 150 includes one or more sensors that are operable to measure the physical environment outside of the ego vehicle 123. For example, the sensor set 150 includes one or more sensors that record one or more physical characteristics of the physical environment that is proximate to the ego vehicle 123. The memory 127 may store sensor data that describes the one or more physical characteristics recorded by the sensor set 150.

In some embodiments, the sensor set 150 of the ego vehicle 123 includes one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

In some embodiments, the sensor set 150 includes any sensors which are necessary to record the information included in the BSM data 195 or provide any of the other functionality described herein.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The ego vehicle 123 may include one or more processors 125. Other processors, operating systems, sensors, displays, and physical configurations may be possible.

The memory 127 is a non-transitory memory that stores instructions or data that may be accessed and executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random-access memory (virtual RAM). The ego vehicle 123 may include one or more memories 127.

In some embodiments, the memory 127 stores, as digital data, any data described herein. In some embodiments, the memory 127 stores any data that is necessary for the drowsy detection system 199 to provide its functionality.

As depicted, the memory 127 stores: BSM data 195; drowsy driving signals data 192; automated driving signals data 193; and determination data 191.

The BSM data 195 is digital data that is included as the payload for a BSM that is received by the DSRC radio 147 or the communication unit 145. The BSM data 195 is described in more detail below with reference to FIGS. 4 and 5.

The drowsy driving signals data 192 is digital data that describes whether the driver monitoring system 152 has determined that a vehicle (e.g., the ego vehicle 123) is being driven by a drowsy driver. See, e.g., step 601 of the method 600 depicted in FIGS. 6A and 6B. For example, in some embodiments the drowsy detection system 199 includes hooks into an ECU of the ego vehicle 123 that operates the drowsy monitoring system 152 so that the drowsy detection system 199 can determine whether the drowsy monitoring system 152 has determined that the ego vehicle 123 is being operated by a drowsy driver. The drowsy detection system 199 uses these hooks to intercept "drowsy driving signals" generated by the driver monitoring system 152 which describe whether the drowsy monitoring system 152 has determined that the ego vehicle 123 is being operated by a drowsy driver. The drowsy driving signals data 192 describes these intercepted signals.

The automated driving signals data 193 is digital data that describes whether an automated driving system (e.g., the set of ADAS systems 180) is engaged such that the ego vehicle 123 is in an automated driving mode. See, e.g., step 605 of the method 600 depicted in FIGS. 6A and 6B. For example, the set of ADAS systems 180 is an automated driving system. The drowsy detection system 199 includes hooks into one or more ECUs of the ego vehicle 123 that operate the automated driving system so that the drowsy detection system 199 can determine whether the automated driving system is in the automated driving mode. The automated driving mode is a mode of operation whereby the ego vehicle 123 is operated as a Level 3 or higher automated vehicle by the set of ADAS systems 180. The drowsy detection system 199 uses these hooks to intercept "automated driving signals" generated by the automated driving system which describe whether the automated driving system is in the automated driving mode. The automated driving signals data 193 describes these intercepted signals.

The determination data 191 is digital data that describes and identifies a particular vehicle (e.g., the ego vehicle 123 or the remote vehicle 124) which the drowsy detection system 199 has determined to be operated by a drowsy driver.

The communication unit 145 transmits and receives data to and from a network 105 or to another communication channel. In some embodiments, the communication unit 145 may include a DSRC transceiver, a DSRC receiver and other hardware or software necessary to make the ego vehicle 123 a DSRC-equipped device.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System," the entirety of which is incorporated herein by reference.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, or any other type of V2X communication.

In some embodiments, the communication unit 145 includes a DSRC radio 147. In some embodiments, the DSRC radio 147 is an electronic device that includes a V2X transmitter and a V2X receiver that is operable to send and receive wireless messages via any V2X protocol. For example, the DSRC radio 147 is operable to send and receive wireless messages via DSRC. The V2X transmitter is operable to transmit and broadcast DSRC messages over the 5.9 GHz band. The V2X receiver is operable to receive DSRC messages over the 5.9 GHz band. The DSRC radio 147 includes seven channels (e.g., DSRC channel numbers 172, 174, 176, 178, 180, 182 and 184) with at least one of these channels reserved for sending and receiving BSMs (e.g., DSRC channel number 172 is reserved for BSMs). In some embodiments, at least one of these channels is reserved for sending and receiving Pedestrian Safety Messages (PSMs) as described in U.S. patent application Ser. No. 15/796,296 filed on Oct. 27, 2017 and entitled "PSM Message-based Device Discovery for a Vehicular Mesh Network," the entirety of which is hereby incorporated by reference. In some embodiments, DSRC channel number 172 is reserved for sending and receiving PSMs. In some embodiments, DSRC channel number 176 is reserved for sending and receiving PSMs.

In some embodiments, the DSRC radio 147 includes a non-transitory memory which stores digital data that controls the frequency for broadcasting BSMs. In some embodiments, the non-transitory memory stores a buffered version of the GPS data for the ego vehicle 123 so that the GPS data for the ego vehicle 123 is broadcast as an element of the BSMs (e.g., as an element of the BSM data 195) which are regularly broadcast by the DSRC radio 147.

In some embodiments, the DSRC radio 147 includes any hardware or software which is necessary to make the ego vehicle 123 compliant with the DSRC standards. In some embodiments, the DSRC-compliant GPS unit 250 depicted in FIG. 2 is an element of the DSRC radio 147.

In some embodiments, the DSRC radio 147 includes a single channel that is dedicated to sending and/or receiving a particular type of wireless message. For example, the DSRC radio 147 includes a single channel that is dedicated to sending and receiving BSMs. In another example, the DSRC radio 147 includes a single channel that is dedicated to receiving PSMs.

In some embodiments, the drowsy detection system 199 includes software that is operable, when executed by the processor 125, to cause the processor 125 to execute one or more steps of the method 300 described below with reference to FIG. 3. In some embodiments, the drowsy detection system 199 includes software that is operable, when executed by the processor 125, to cause the processor 125 to execute one or more steps of the method 600 described below with reference to FIGS. 6A and 6B. The functionality of the drowsy detection system 199 is described in more detail below according to some embodiments.

In some embodiments, the drowsy detection system 199 is implemented using hardware including a field-programmable gate array ("FPGA") or an application-specific integrated circuit ("ASIC"). In some other embodiments, the drowsy detection system 199 implemented using a combination of hardware and software.

The remote vehicle 124 is a connected vehicle similar to the ego vehicle 123. The remote vehicle 124 includes elements that are similar to those included in the ego vehicle 123. As depicted, the remote vehicle 124 includes a drowsy detection system 199 and a communication unit 146 having a DSRC radio 148. The communication unit 146 and the DSRC radio 148 provide similar functionality as the communication unit 145 and the DSRC radio 147 described above for the ego vehicle 123, and so, those descriptions will not be repeated here. The drowsy detection system 199 of the remote vehicle 124 provides similar functionality as the drowsy detection system 199 of the ego vehicle 123, and so, that description will not be repeated here. The remote vehicle 124 may include any of the elements that are included in the ego vehicle 123.

The drowsy detection system 199 is described herein with reference to DSRC, but the functionality of the drowsy detection system 199 is not limited to DSRC. Instead, the drowsy detection system 199 works with any V2X communication protocol including, among others, LTE-V2X and 5G-V2X.

Driving a vehicle while drowsy is dangerous. The NHTSA estimated that, between 2009 and 2013, drowsy driving has the following affects: 72,000 police-reported crashes per year; 41,000 injuries per year; and more than 800 deaths per year. The purpose of our invention is to decrease the damage done by drowsy driving using V2X communications.

The drowsy detection system 199 is operable to provide two solutions to the problem of drowsy driving. Each are described below according to some embodiments.

First Example Solution

Vehicles are increasingly equipped with DSRC capabilities. DSRC-equipped vehicles transmit BSMs at a regular interval (e.g., once every 0.10 seconds). BSMs have a mandatory payload (referred to as "BSM data 195") that includes, among other things, information about the path history of the vehicle that transmits the BSM. Examples of the information described by the BSM data 195 are depicted in FIGS. 4 and 5. This information also includes the GPS location for the vehicle that transmitted the BSM, as well as its trajectory information.

This example solution assumes that the remote vehicle 124 is driven by a drowsy driver. The remote vehicle 124 is DSRC-equipped, and it regularly transmits BSMs that include path history data of the remote vehicle 124. The ego vehicle 123 receives the BSMs from the remote vehicle 124. The drowsy detection system 199 of the ego vehicle 123 analyzes the path history data included in these BSMs. Based on this analysis, the drowsy detection system 199 identifies the presence of the drowsy driver operating the remote vehicle 124. The ego vehicle 123 is driven by an ego driver. The drowsy detection system 199 notifies the ego driver of the presence of the drowsy driver so that they can take steps to mitigate the danger posed to them by the drowsy driver.

If the ego vehicle 123 is an autonomous vehicle, then the drowsy detection system 199 notifies the autonomous driving system of the ego vehicle 123 about the identity of the remote vehicle 124 having the drowsy driver so that the autonomous driving system responds to the presence of the drowsy driver, e.g., by driving further away from them and not applying standard driving models to predict the behavior of the drowsy driver. Instead, models that predict the behavior of drowsy drivers may be applied. The method 300 depicted in FIG. 3 is an example embodiment of the first solution.

Second Example Solution

This example solution assumes that the ego vehicle 123 is driven by a drowsy driver and the remote vehicle 124 is driven by a "remote driver." Both the ego vehicle 123 and the remote vehicle 124 are DSRC-equipped, and both include their own instance the drowsy detection system 199. The drowsy detection system 199 provides different functionality for these endpoints, but it could be the same software operating in different modes based on whether it is the transmitter (Tx) or receiver (Rx) of a BSM.

In addition to the drowsy detection system 199, the ego vehicle 123 includes a driver monitoring system 152 that detects that the ego driver is drowsy.

In some embodiments, the drowsy detection system 199 of the ego vehicle 123 is installed in an ECU that operates the driver monitoring system 152 for the ego vehicle 123. The drowsy detection system 199 of the ego vehicle 123 includes code and routines that are operable, when executed by the ECU, to cause the ECU to execute the following steps of an example process:

At step 1, identify when the ECU is processing signals that indicate that the ego driver is drowsy. In some embodiments, the drowsy detection system 199 of the ego vehicle 123 includes hooks in the code of the driver monitoring system 152 so that it is able to determine the presence of a drowsy driver without monitoring for signals within the ECU or some other activity outside of the driver monitoring system 152.

At step 2, determine whether the ego vehicle 123 is in automated driving mode. For example, the drowsy detection system 199 of the ego vehicle 123 determines whether the ego vehicle 123 includes an automated driving system and, if so, whether the automated driving system is currently engaged. If the ego vehicle 123 does not include an automated driving system, then this step may be skipped.

In some embodiments, the drowsy detection system 199 of the ego vehicle inserts digital data into the BSM data 195 of a BSM transmitted by the ego vehicle 123 that describes (1) whether ego driver of the ego vehicle 123 is drowsy; and (2) whether the ego vehicle 123 is in automated driving mode [i.e., because the driver's drowsiness does not matter if automated driving is engaged]. The ego vehicle 123 transmits the BSM.

Figure 6A:
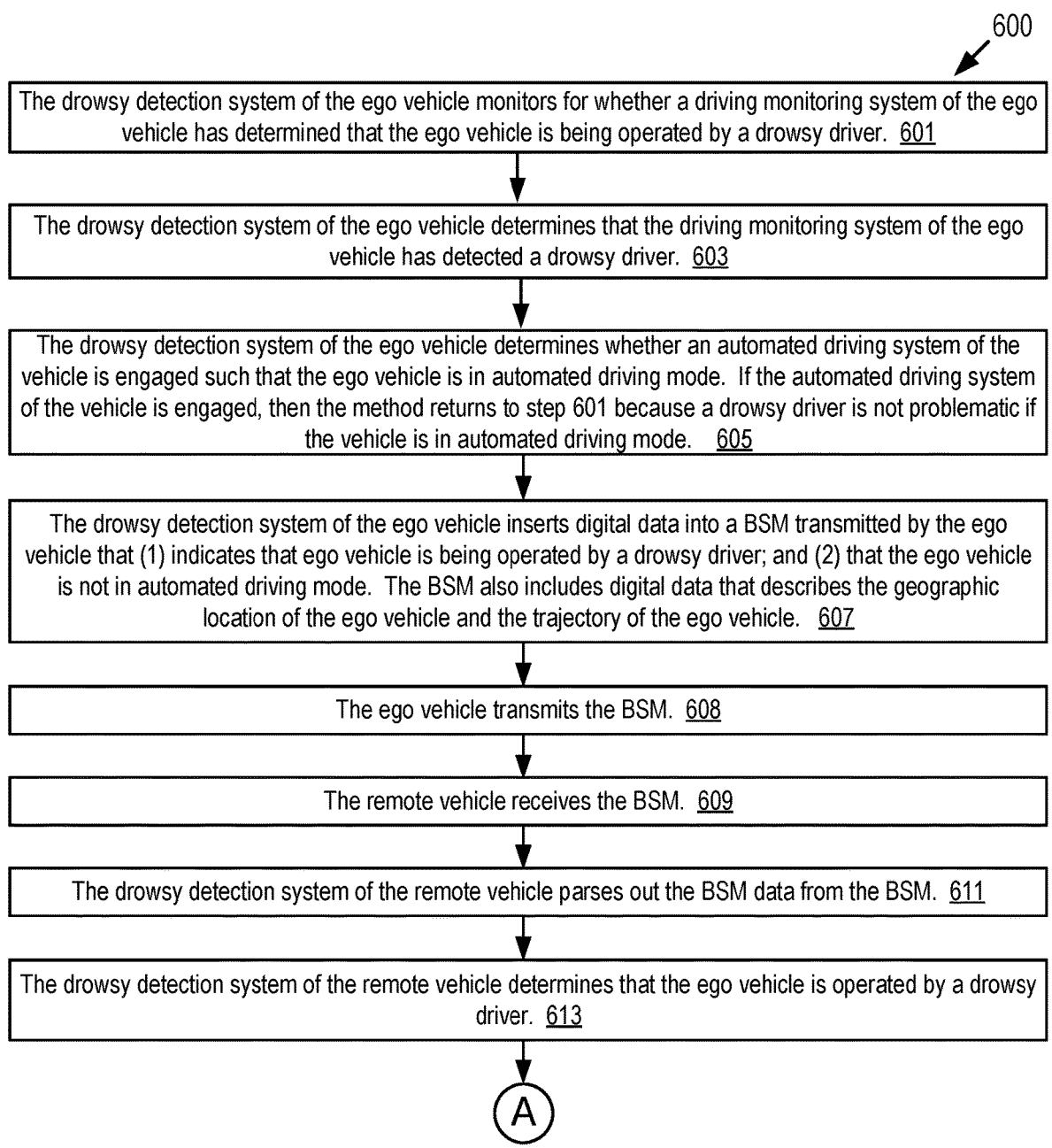
FIGS. 6A and 6B depict a method for modifying the operation of a connected vehicle to reduce the risk caused by a drowsy driver according to some embodiments.
Figure 6B:
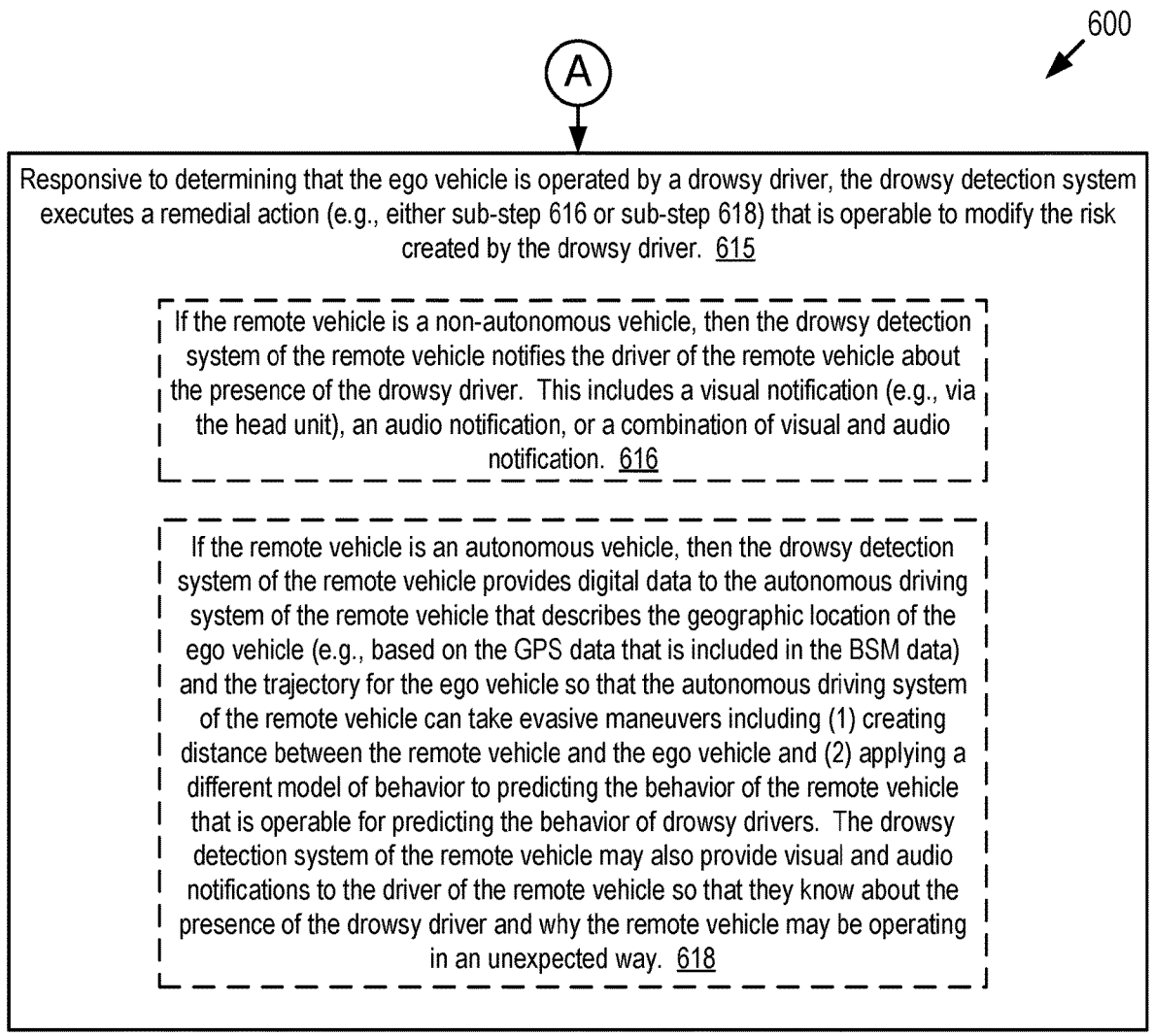

The remote vehicle 124 receives the BSM. The drowsy detection system 199 of the remote vehicle 124 analyzes the BSM data 195 to determine whether it indicates that the ego vehicle 123 is being operated by a drowsy driver. If so, the drowsy detection system 199 of the remote vehicle 124 notifies the remote driver of the remote vehicle 124 about the presence of the drowsy driver (e.g., the driver of the ego vehicle 123) so that they can take steps to mitigate the danger posed to them and the remote vehicle 124 by the drowsy driver. If the remote vehicle 124 is an autonomous vehicle, then the remote vehicle 124 automatically responds to the danger posed by the drowsy driver (e.g., by not assuming that the ego vehicle 123 will be driven based on existing models of driver behavior). The method 600 depicted in FIGS. 6A and 6B is an example embodiment of the second solution.

For first solution, the remote vehicle 124 does not need to include a drowsy detection system but the ego vehicle 123 does need to include a drowsy detection system. For second solution, both the remote vehicle 124 and the ego vehicle 123 include a drowsy detection system 199.

Neither the first solution nor the second solution requires an automated driving system in either the ego vehicle 123 or the remote vehicle 124, but the drowsy detection system 199 is compatible with automated driving systems and has unique functionality if an automated driving system is present in the vehicle and also engaged such that the vehicle is operated in automated driving mode.

Example Computer System

Figure 2:
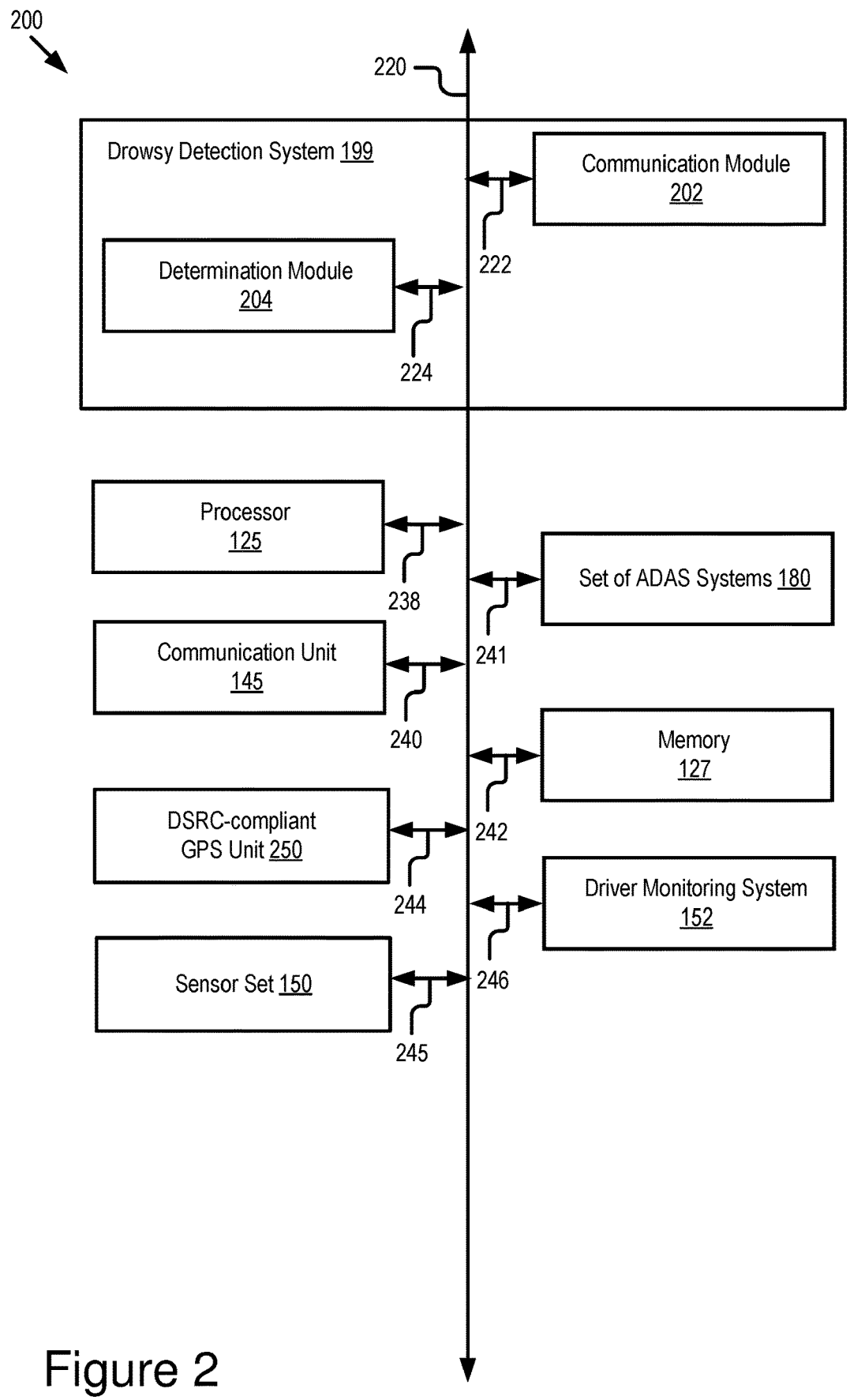
FIG. 2 is a block diagram illustrating an example computer system including the drone assistance system according to some embodiments.

Referring now to FIG. 2, depicted is a block diagram illustrating an example computer system 200 including the drowsy detection system 199 according to some embodiments. In some embodiments, the computer system 200 may include a special-purpose computer system that is programmed to perform one or more steps of one or more of the method 300 described below with reference to FIG. 3. In some embodiments, the computer system 200 may include a special-purpose computer system that is programmed to perform one or more steps of one or more of the method 600 described below with reference to FIGS. 6A and 6B. In some embodiments, the computer system 200 is an onboard vehicle computer of the ego vehicle 123. In some embodiments, the computer system 200 is an onboard unit of the ego vehicle 123. In some embodiments, the computer system 200 is an ECU, head unit or some other processor-based computing device of the ego vehicle 123.

The computer system 200 includes one or more of the following elements according to some examples: the drowsy detection system 199; the processor 125; the communication unit 145; the memory 127; the set of ADAS systems 180; the sensor set 150; the driver monitoring system 152; and a DSRC-compliant GPS unit 250. The components of the computer system 200 are communicatively coupled by a bus 220.

In the illustrated embodiment, the processor 125 is communicatively coupled to the bus 220 via a signal line 238. The communication unit 145 is communicatively coupled to the bus 220 via a signal line 240. The memory 127 is communicatively coupled to the bus 220 via a signal line 242. The set of ADAS systems 180 is communicatively coupled to the bus 220 via a signal line 241. The sensor set 150 is communicatively coupled to the bus 220 via a signal line 245. The driver monitoring system 152 is communicatively coupled to the bus 220 via a signal line 246. The DSRC-compliant GPS unit 250 is communicatively coupled to the bus 220 via a signal line 244.

The following elements were described above with reference to FIG. 1, and so, those descriptions will not be repeated here: the processor 125; the communication unit 145; the memory 127; the set of ADAS systems 180; the sensor set 150; and the driver monitoring system 152.

The memory 127 may store any of the data described above with reference to FIG. 1 or below with reference to FIGS. 2-6B. The memory 127 may store any data needed for the computer system 200 to provide its functionality.

In some embodiments, the DSRC-compliant GPS unit 250 includes any hardware and software necessary to make the ego vehicle 123, computer system 200, or the DSRC-compliant GPS unit 250 compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In some embodiments, the DSRC-compliant GPS unit 250 is operable to provide GPS data describing the location of the ego vehicle 123 with lane-level accuracy. For example, the ego vehicle 123 is traveling in a lane of a roadway. Lane-level accuracy means that the location of the ego vehicle 123 is described by the GPS data so accurately that the lane of travel of the ego vehicle 123 within the roadway may be accurately determined based on the GPS data for this ego vehicle 123 as provided by the DSRC-compliant GPS unit 250. In some embodiments, the GPS data is an element of the BSM data 195 (see, e.g., FIGS. 4 and 5).

In some embodiments, the DSRC-compliant GPS unit 250 includes hardware that wirelessly communicates with a GPS satellite to retrieve GPS data that describes the geographic location of the ego vehicle 123 with a precision that is compliant with the DSRC standard. The DSRC standard requires that GPS data be precise enough to infer if two vehicles (one of which is, for example, the ego vehicle 123) are located in adjacent lanes of travel. In some embodiments, the DSRC-compliant GPS unit 250 is operable to identify, monitor and track its two-dimensional position within 1.5 meters of its actual position 68% of the time under an open sky. Since driving lanes are typically no less than 3 meters wide, whenever the two-dimensional error of the GPS data is less than 1.5 meters the drowsy detection system 199 described herein may analyze the GPS data provided by the DSRC-compliant GPS unit 250 and determine what lane the ego vehicle 123 is traveling in based on the relative positions of two or more different vehicles (one of which is, for example, the ego vehicle 123) traveling on the roadway at the same time.

By comparison to the DSRC-compliant GPS unit 250, a conventional GPS unit which is not compliant with the DSRC standard is unable to determine the location of an ego vehicle 123 with lane-level accuracy. For example, a typical roadway lane is approximately 3 meters wide. However, a conventional GPS unit only has an accuracy of plus or minus 10 meters relative to the actual location of the ego vehicle 123. As a result, such conventional GPS units are not sufficiently accurate to identify a lane of travel for an ego vehicle 123 based on GPS data alone; instead, systems having only conventional GPS units must utilize sensors such as cameras to identify the lane of travel of the ego vehicle 123. Identifying a lane of travel of a vehicle is beneficial, for example, because in some embodiments it may enable the automated driving system to do a better job of avoiding the vehicle which is operated by a drowsy driver.

In the illustrated embodiment shown in FIG. 2, the drowsy detection system 199 includes: a communication module 202; and a determination module 204.

The communication module 202 can be software including routines for handling communications between the drowsy detection system 199 and other components of the operating environment 100 of FIG. 1.

In some embodiments, the communication module 202 can be a set of instructions executable by the processor 125 to provide the functionality described below for handling communications between the drowsy detection system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100. For example, the communication module 202 receives or transmits, via the communication unit 145, some or all of the digital data stored on the memory 127. The communication module 202 may send or receive any of the digital data or messages described above with reference to FIG. 1 or below with reference to FIGS. 2-6B, via the communication unit 145.

In some embodiments, the communication module 202 receives data from components of the drowsy detection system 199 and stores the data in the memory 127 (or a buffer or cache of the memory 127, or a standalone buffer or cache which is not depicted in FIG. 2). For example, the communication module 202 broadcasts a BSM message including the BSM data 195 from the communication unit 145 at a regular interval such as once every 0.1 seconds.

In some embodiments, the communication module 202 may handle communications between components of the drowsy detection system 199. For example, the communication module 202 transmits the GPS data from the memory 127 to the determination module 204 so that the determination module 204 is able to form BSM data 195 including the GPS data as an element of the BSM data 195.

In some embodiments, the determination module 204 can be a set of instructions executable by the processor 125 which are operable, when executed by the processor 125, to cause the processor 125 to execute one or more steps of the method 300 described below with reference to FIG. 3. In some embodiments, the determination module 204 can be a set of instructions executable by the processor 125 which are operable, when executed by the processor 125, to cause the processor 125 to execute one or more steps of the method 600 described below with reference to FIGS. 6A and 6B. In some embodiments, the determination module 204 can be stored in the memory 127 of the computer system 200 and can be accessible and executable by the processor 125. The determination module 204 may be adapted for cooperation and communication with the processor 125 and other components of the computer system 200 via signal line 224.

Example Processes

Figure 3:
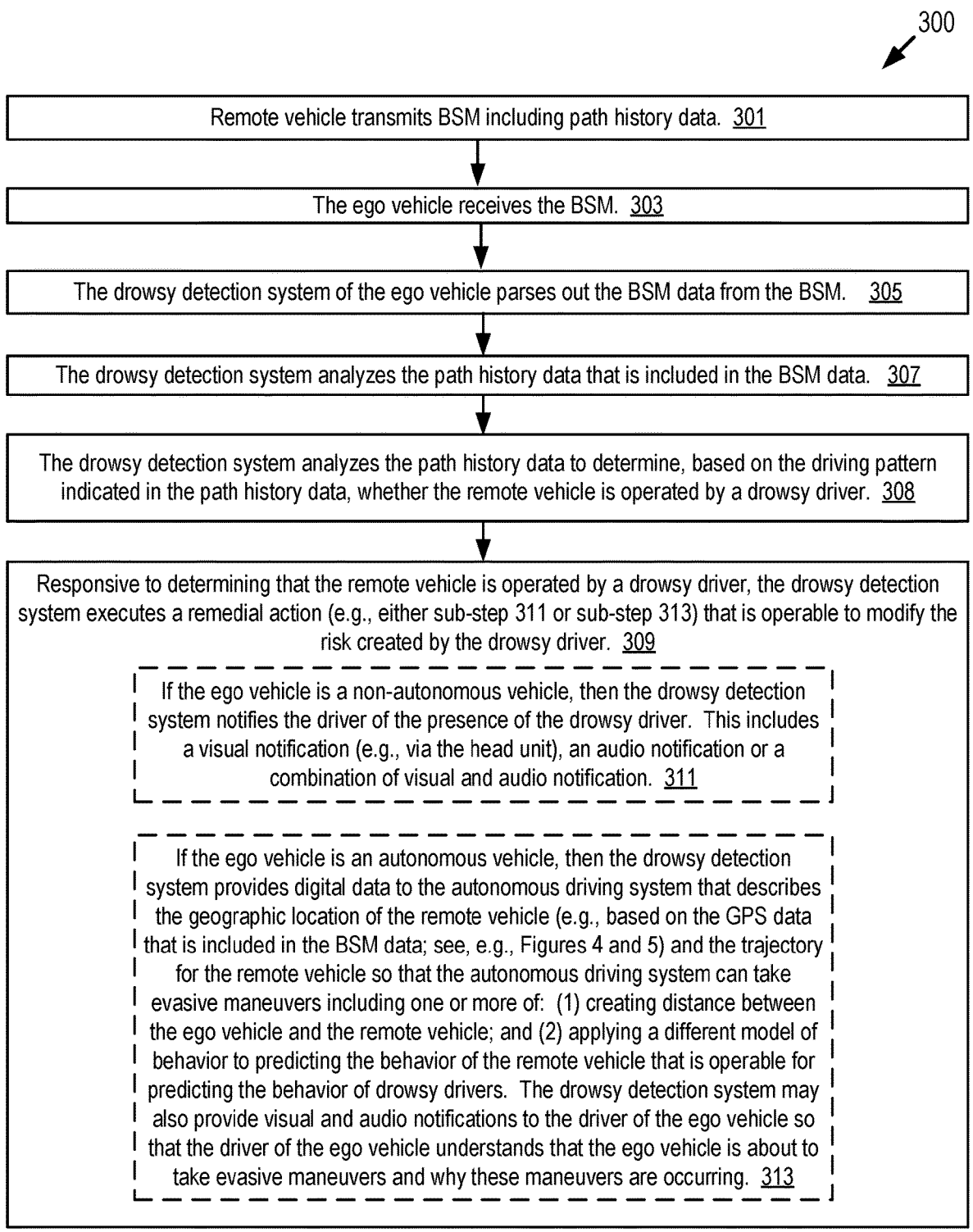
FIG. 3 depicts a method for modifying the operation of a connected vehicle to reduce the risk caused by a drowsy driver according to some embodiments.

FIG. 3 depicts a method 300 for modifying the operation of a connected vehicle to reduce the risk caused by a drowsy driver according to some embodiments. The steps of the method 300 are executable in any order, and not necessarily the order depicted in FIG. 3.

At step 301, a remote vehicle transmits BSM including path history data.

At step 303, an ego vehicle receives the BSM.

At step 305, the drowsy detection system of the ego vehicle parses out the BSM data from the BSM.

At step 307, the drowsy detection system analyzes the path history data that is included in the BSM data.

At step 308, the drowsy detection system analyzes the path history data to determine, based on the driving pattern indicated in the path history data, whether the remote vehicle is operated by a drowsy driver.

At step 309, responsive to determining that the remote vehicle is operated by a drowsy driver, the drowsy detection system executes a remedial action (e.g., either sub-step 311 or sub-step 313) that is operable to modify the risk created by the drowsy driver.

At sub-step 311, if the ego vehicle is a non-autonomous vehicle, then the drowsy detection system notifies the driver of the presence of the drowsy driver. This includes a visual notification (e.g., via the head unit), an audio notification or a combination of visual and audio notification.

At sub-step 313, if the ego vehicle is an autonomous vehicle, then the drowsy detection system provides digital data to the autonomous driving system that describes the geographic location of the remote vehicle (e.g., based on the GPS data that is included in the BSM data; see, e.g., FIGS. 4 and 5) and the trajectory for the remote vehicle so that the autonomous driving system can take evasive maneuvers including one or more of: (1) creating distance between the ego vehicle and the remote vehicle; and (2) applying a different model of behavior to predicting the behavior of the remote vehicle that is operable for predicting the behavior of drowsy drivers. The drowsy detection system may also provide visual and audio notifications to the driver of the ego vehicle so that the driver of the ego vehicle understands that the ego vehicle is about to take evasive maneuvers and why these maneuvers are occurring.

Referring now to FIG. 4, depicted is a block diagram illustrating an example of the BSM data 195 according to some embodiments.

The regular interval for transmitting BSMs may be user configurable. In some embodiments, a default setting for this interval may be transmitting the BSM every 0.1 seconds or substantially every 0.1 seconds.

A BSM is broadcasted over the 5.9 GHz DSRC band. DSRC range may be substantially 1,000 meters. In some embodiments, DSRC range may include a range of substantially 100 meters to substantially 1,000 meters. DSRC range is generally 300 to 500 meters depending on variables such as topography and occlusions between DSRC-equipped endpoints.

Referring now to FIG. 5, depicted is a block diagram illustrating an example of BSM data 195 according to some embodiments.

A BSM may include two parts. These two parts may include different BSM data 195 as shown in FIG. 5.

Part 1 of the BSM data 195 may describe one or more of the following: the GPS data of the vehicle; vehicle heading; vehicle speed; vehicle acceleration; vehicle steering wheel angle; and vehicle size.

Part 2 of the BSM data 195 may include a variable set of data elements drawn from a list of optional elements. Some of the BSM data 195 included in Part 2 of the BSM are selected based on event triggers, e.g., anti-locking brake system ("ABS") being activated may trigger BSM data 195 relevant to the ABS system of the vehicle.

In some embodiments, some of the elements of Part 2 are transmitted less frequently in order to conserve bandwidth.

In some embodiments, the BSM data 195 included in a BSM includes current snapshots of a vehicle.

Referring now to FIGS. 6A and 6B, depicted is a method 600 for modifying the operation of a connected vehicle to reduce the risk caused by a drowsy driver according to some embodiments.

Referring now to FIG. 6A, at step 601 the drowsy detection system of the ego vehicle monitors for whether a driver monitoring system of the ego vehicle has determined that the ego vehicle is being operated by a drowsy driver.

At step 603, the drowsy detection system of the ego vehicle determines that the driver monitoring system of the ego vehicle has detected a drowsy driver.

At step 605, the drowsy detection system of the ego vehicle determines whether an automated driving system of the vehicle is engaged such that the ego vehicle is in automated driving mode. If the automated driving system of the vehicle is engaged, then the method returns to step 601 because a drowsy driver is not problematic if the vehicle is in automated driving mode.

At step 607, the drowsy detection system of the ego vehicle inserts digital data into a BSM transmitted by the ego vehicle that (1) indicates that ego vehicle is being operated by a drowsy driver; and (2) that the ego vehicle is not in automated driving mode. The BSM also includes digital data that describes the geographic location of the ego vehicle and the trajectory of the ego vehicle.

At step 608, the ego vehicle transmits the BSM.

At step 609, the remote vehicle receives the BSM.

At step 611, the drowsy detection system of the remote vehicle parses out the BSM data from the BSM.

At step 613, the drowsy detection system of the remote vehicle determines that the ego vehicle is operated by a drowsy driver.

Referring now to FIG. 6B, at step 615, responsive to determining that the ego vehicle is operated by a drowsy driver, the drowsy detection system executes a remedial action (e.g., either sub-step 616 or sub-step 618) that is operable to modify the risk created by the drowsy driver.

At sub-step 616, if the remote vehicle is a non-autonomous vehicle, then the drowsy detection system of the remote vehicle notifies the driver of the remote vehicle about the presence of the drowsy driver. This includes a visual notification (e.g., via the head unit), an audio notification or a combination of visual and audio notification.

At sub-step 618, if the remote vehicle is an autonomous vehicle, then the drowsy detection system of the remote vehicle provides digital data to the autonomous driving system of the remote vehicle that describes the geographic location of the ego vehicle (e.g., based on the GPS data that is included in the BSM data) and the trajectory for the ego vehicle so that the autonomous driving system of the remote vehicle can take evasive maneuvers including (1) creating distance between the remote vehicle and the ego vehicle and (2) applying a different model of behavior to predicting the behavior of the remote vehicle that is operable for predicting the behavior of drowsy drivers. The drowsy detection system of the remote vehicle may also provide visual and audio notifications to the driver of the remote vehicle so that they know about the presence of the drowsy driver and why the remote vehicle may be operating in an unexpected way.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
receiving, by a first connected vehicle, a Vehicle-to-Everything (V2X) message including digital data describing a path history of a second connected vehicle;
determining, by the first connected vehicle, that a second driver of the second connected vehicle is drowsy based on the path history described by the digital data included in the V2X message;
determining whether the second connected vehicle is in an automated driving mode;
responsive to the second connected vehicle not being in automated driving mode, providing a notification to a first driver of the first connected vehicle; and
responsive to the second connected vehicle being in automated driving mode, the first connected vehicle automatically taking an evasive maneuver to avoid the second connected vehicle
so that a risk created by the second driver is reduced.

2. The method of claim 1, wherein the V2X message is a Dedicated Short-Range Communication (DSRC) message.

3. The method of claim 1, wherein the V2X message is not one of the following: a WiFi message; a 3G message; a 4G message; a 5G message; a Long-Term Evolution (LTE) message; a millimeter wave communication message; a Bluetooth message; and a satellite communication.

4. The method of claim 1, wherein the V2X message is a Basic Safety Message.

5. The method of claim 1, wherein the digital data describes a location of the second connected vehicle with an accuracy of substantially plus or minus half a width of a roadway which is being traveled by the second connected vehicle.

6. The method of claim 1, wherein the notification is at least one of a visual notification that is displayed in a head unit and an audio notification.

7. The method of claim 1, wherein the digital data includes whether the second connected vehicle is in the automated driving mode and determining whether the second connected vehicle is in the automated driving mode based on the digital data.

8. A system comprising:
a processor of a first connected vehicle that is operable to receive a Vehicle-to-Everything (V2X) message including digital data describing a path history of a second connected vehicle; and
a non-transitory memory communicatively coupled to the processor, wherein the non-transitory memory stores computer code that is operable, when executed by the processor, to cause the processor to:
determine that a second driver of the second connected vehicle is drowsy based on the path history described by the digital data included in the V2X message;
determining whether the second connected vehicle is in an automated driving mode;
responsive to the second connected vehicle not being in automated driving mode, providing a notification to a first driver of the first connected vehicle; and
responsive to the second connected vehicle being in automated driving mode, the first connected vehicle automatically taking an evasive maneuver to avoid the second connected vehicle
so that a risk created by the second driver is reduced.

9. The system of claim 8, wherein the V2X message is a Dedicated Short-Range Communication (DSRC) message.

10. The system of claim 8, wherein the V2X message is not one of the following: a WiFi message; a 3G message; a 4G message; a 5G message; a Long-Term Evolution (LTE) message; a millimeter wave communication message; a Bluetooth message; and a satellite communication.

11. The system of claim 8, wherein the V2X message is a Basic Safety Message.

12. The system of claim 8, wherein the digital data describes a location of the second connected vehicle with an accuracy of substantially plus or minus half a width of a roadway which is being traveled by the second connected vehicle.

13. The system of claim 8, wherein the notification is at least one of a visual notification that is displayed in a head unit and an audio notification.

14. The system of claim 8, wherein the digital data includes whether the second connected vehicle is in the automated driving mode and determining whether the second connected vehicle is in the automated driving mode based on the digital data.

15. A non-transitory computer-readable medium comprising instructions that, when executed by a processor of a first connected vehicle, causes the processor to perform operations comprising:
receiving a Vehicle-to-Everything (V2X) message including digital data describing a path history of a second connected vehicle;
determining that a second driver of the second connected vehicle is drowsy based on the path history described by the digital data included in the V2X message;
determining whether the second connected vehicle is in an automated driving mode;
responsive to the second connected vehicle not being in automated driving mode, providing a notification to a first driver of the first connected vehicle; and
responsive to the second connected vehicle being in automated driving mode, the first connected vehicle automatically taking an evasive maneuver to avoid the second connected vehicle
so that a risk created by the second driver is reduced.

16. The computer program product of claim 15, wherein the V2X message is a Dedicated Short-Range Communication (DSRC) message.

17. The computer program product of claim 15, wherein the V2X message is not one of the following: a WiFi message; a 3G message; a 4G message; a 5G message; a Long-Term Evolution (LTE) message; a millimeter wave communication message; a Bluetooth message; and a satellite communication.

18. The computer program product of claim 15, wherein the evasive maneuver includes at least one of (a) creating distance between the first connected vehicle and the second connected vehicle and (b) applying a different model of behavior to predict the behavior of the second connected vehicle that predicts the behavior of a drowsy driver.

19. The computer program product of claim 15, wherein the notification is at least one of a visual notification that is displayed in a head unit and an audio notification.

20. The computer program product of claim 15, wherein the digital data includes whether the second connected vehicle is in the automated driving mode and determining whether the second connected vehicle is in the automated driving mode based on the digital data.

* * * * *